United States Patent [19]

Jones et al.

[11] 4,136,394
[45] Jan. 23, 1979

[54] GOLF YARDAGE INDICATOR SYSTEM

[75] Inventors: Joseph Jones, 121110A Rancho Bernardo Rd., San Diego, Calif. 92128; Steven J. Pang, Honolulu, Hi.; Roland L. Woodard, Jr., 1308 National Ave., New Bern, N.C. 28560

[73] Assignees: Joseph Jones, Olivenhain, Calif.; Roland L. Woodard, Jr., New Bern, N.C.

[21] Appl. No.: 836,073

[22] Filed: Sep. 23, 1977

[51] Int. Cl.² ............................................. G01S 11/00
[52] U.S. Cl. .................................. 364/561; 340/16 R; 364/410; 273/32 B
[58] Field of Search .................. 364/561, 562, 410; 340/16, 1; 343/112 PT, 112 D, 16 R; 273/32 B

[56] References Cited

U.S. PATENT DOCUMENTS

| 1,620,290 | 3/1927 | Rubin | 273/213 |
|---|---|---|---|
| 2,331,237 | 10/1943 | Schaefer | 273/35 |
| 2,366,800 | 1/1945 | Norrman | 177/352 |
| 2,910,665 | 10/1959 | Hawkins | 340/2 |
| 3,564,489 | 2/1971 | Pure et al. | 340/2 |
| 3,566,348 | 2/1971 | Leyden et al. | 340/16 |
| 3,731,273 | 5/1973 | Hunt | 340/16 |
| 3,784,207 | 1/1974 | Gentiluomo | 273/176 A |
| 3,868,692 | 2/1975 | Woodard | 343/112 D |
| 4,055,830 | 10/1977 | Wilson et al. | 340/16 R |

*Primary Examiner*—Edward J. Wise
*Attorney, Agent, or Firm*—Bosworth, Sessions & McCoy

[57] ABSTRACT

A golf distance indicator system provides a measurement of the distance between a golfer and the green which he is approaching. The system comprises a base unit mounted at or near the pin on the green and a remote unit carried by the golfer. Upon command, the remote unit transmits a radio pulse to the base unit. The base unit immediately returns an acoustic or sonic signal, preferably an ultrasonic signal, in response to the received radio pulse. The remote unit includes internal logic for determining the distance from the base unit to the remote unit from the time interval between the transmission of the radio pulse and the reception of the ultrasonic signal based upon the speed of sound waves through air. The remote unit also receives input wind conditions and determines range and direction corrections to the actual distance based upon these wind conditions. From the wind corrected distance, the remote unit automatically selects the proper club for the next shot.

10 Claims, 10 Drawing Figures

GOLF YARDAGE INDICATOR SYSTEM

BACKGROUND OF THE INVENTION

1. Field of the Invention

This invention relates to a range finding device particularly useful in golfing to measure the distance to the green which the golfer is approaching.

2. Description of the Prior Art

After teeing off on a typical four or five-par hole, the golfer is often left with a second shot of up to 200 yards or more. In selecting the club for the next shot, it is important for the golfer to accurately determine the distance to the pin on the green, so that he may reach the green without overshooting, or undershooting.

There have been several methods of ascertaining the distance to the pin. By far the most common method is simply to estimate the distance based upon prior knowledge of the particular golf course or based upon certain landmarks adjacent to the fairway. Such estimates are typically very inaccurate.

Another approach in determining the yardage to the green for the golfer's next shot is for the golfer to pace off the distance one step at a time, and then estimate that each step is a yard. This procedure is extremely time consuming, and thus detracts from the enjoyment of the game by the following group of golfers.

A few hand-held devices have been developed for the golfer to use in distance determination. For example, one particular type of range finder is a slide viewing window having a vertical extent calibrated in yards while the space between the upper and lower viewing lines is adjusted. The golfer sights through an opening in the range finder and adjusts the upper and lower viewing lines until they correspond substantially to the upper and lower extent of the pin located on the green. Once this is done, the viewer looks to the side of the indicator to read the range in yards, thereby allowing him to select the appropriate club for his next shot. While this is a comparatively simple device, it still requires a relatively steady hand of the golfer to hold the sight window in place while aligning the upper and lower movable lines.

Another range finding device is disclosed in U.S. Pat. No. 3,868,692, one of the coinventors thereof being a coinventor of the present invention. That device comprises a portable unit adapted to receive a RF signal emitted by a transmitter on the pin and to estimate the distance to the pin based on the intensity of the signal. While this device is superior to other prior art devices, it still lacks sufficient accuracy.

None of these prior art devices take into account the effects of the wind in the determination of the distance to the pin. Any head wind or tail wind can effectively increase or decrease the distance for the purposes of club selection. Furthermore, a cross wind may require shot placement to the left or right of the pin. In addition, all of the prior art range finding devices require the golfer to estimate the proper club selection based upon the indicated yardage.

SUMMARY OF THE INVENTION

It is among the objects of the present invention to provide a golf distance indicator system which overcomes the limitations, complications and inaccuracies of the prior art methods and devices. The system of this invention includes a remote unit to be carried by the golfer, which remote unit is compact, lightweight and easy to use. The golf yardage indicator is highly accurate, being capable of measuring from the golfer to the hole to within an error of 2 percent. The design of the distance indicator system utilizes LSI and MSI technology to provide small, lightweight and highly reliable units. The remote unit takes into account the wind direction and strength and provides a wind corrected distance measurement to the golfer, so that the golfer receives an indication of the effective distance to pin and of the lateral distance to the side of pin to which the shot must be placed in order to compensate for cross drift of the ball in flight. In addition, the unit automatically displays the proper club selection to the golfer based upon the effective distance to the pin corrected for wind condtions.

These and other objects are accomplished by the present invention which provides a golf distance indicator system having a base unit mounted at or near the point on the green and a remote unit carried by the golfer. Upon command, the remote unit transmits a radio frequency (RF) pulse to the base unit. The base unit immediately returns an acoustic or sonic signal, preferably an ultrasonic signal, in response to the received RF pulse.

The remote unit includes internal circuitry for determining the distance from the base unit to the remote unit from the time interval between the transmission of the RF pulse and the reception of the ultrasonic signal based upon the speed of sound through air since the radio signal travels essentially instantaneously. This circuitry includes an oscillator for producing a timing singnal having frequency related to the speed of sound. Preferably, the timing signal has one cycle for each yard travelled by the sound wave. A counter which counts the oscillations of the timing signal is enabled simultaneously with the transmission of the RF pulse and is disabled in response to the reception of the ultrasonic signal. The actual distance measurement in yards is then read directly from the counter.

The golf distance indicator system includes the capability to input wind direction and wind strength conditions in the remote unit, from which the unit circuitry determines corrections in effective range and direction of the shot due to the wind. In addition, the remote unit automatically selects the proper club for the shot based upon the wind corrected distance.

DESCRIPTION OF THE PREFERRED EMBODIMENT

Figure 1:
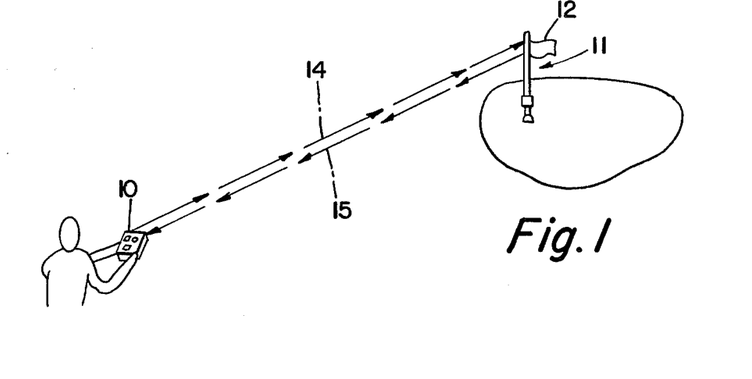
FIG. 1 is a perspective diagrammatic view illustrating the relationship between the base unit and the remote unit of the golf yardage indicator system of the present invention in measuring the actual distance between the golfer and the pin on the green being approached.

Referring initially to FIG. 1, the golf distance indicator system of the present invention comprises a handheld remote unit 10 which is carried by the golfer and a base unit 11 which is placed near or is attached to the flag pole 12. The system may be installed on the golf course, in which a separate base unit is installed at each hole on the course, or if the system has not been installed on the golf course, the golfer may provide his own portable base unit which may be set up at the green to which he is shooting and thereafter moved to the next hole. Upon command by the golfer, the remote unit 10 emits a radio frequency (RF) pulse 14 toward the base unit 11. The base unit 11 upon receiving the pulse 14 from the remote unit 10 emits an acoustic, sonic or other pressure-type signal 15 toward the remote unit 10. Preferably, the base unit 11 emits an ultrasonic signal to avoid disturbing other golfers. Upon receipt of the ultrasonic signal 15 the remote unit measures the time interval between the sending of the RF pulse 14 and the receipt of the ultrasonic signal 15. From this time interval the internal logic in the remote unit 10 determines the distance between the remote unit and the base unit 11 based upon the speed of the ultrasonic signal through air, the transmission of the RF pulse being essentially instantaneous. An accurate measurement of the distance between the golfer and the flag pole 12 is thereby provided.

Figure 2:
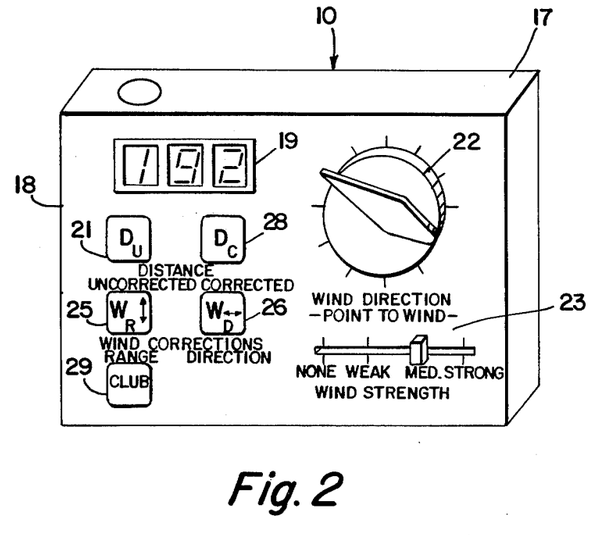
FIG. 2 is a perspective view of the remote unit of FIG. 1 to a larger scale illustrating its external features.

The external features of the remote unit 10 can be seen in greater detail in FIG. 2. The remote unit 10 comprises an outer casing 17 having a front panel 18 containing keys actuating the control switches for operation of the unit and a three-digit LCD or LED display 19. The control switches include a "distance uncorrected" switch 21. When the golfer strikes the key activating the switch 21, the remote unit 10 emits the RF pulse 14 and measures the distance to the flag pole 12 from the returning ultrasonic signal 15. The resulting distance in yards is determined and can be read from the LED display 19. For example, if after hitting his drive, a golfer is left with a shot which measures exactly 148 yards to the pin, the golfer carrying the remote unit 10 may press the key activating the switch 21 and read 148 on the display 19.

The front panel 18 of the remote unit 10 also contains a wind direction dial 22. After pointing the remote unit 10 at the pin, the golfer adjusts the wind direction dial 22 so that it points in the direction from which the wind is blowing. The remote unit 10 also has a wind strength switch 23 capable of four adjustments indicating the strength or velocity of the wind. Adjacent to the distance uncorrected switch 21 are keys for a pair of wind correction switches, comprising a wind range correction switch 25 and a wind direction correction switch 26. After setting the wind direction dial 22 and the wind strength switch 23, the player may strike the key activating wind range correction switch 25 and the display 19 will show the number of yards which must be added or subtracted from the uncorrected distance to the pin to compensate for the wind. Similarly, upon striking the wind direction correction switch 26, the golfer may read from the display 19 the number of yards that he must aim his shot to the right or left of the pin to compensate for the cross drift of the ball in flight due to the wind. For example, if the golfer having a 148-yard shot is playing with a 10 mph wind blowing left-to-right and toward the golfer at an angle of approximately 30°, the golfer sets the wind strength switch 23 to the "medium" setting and sets the wind direction dial 22 appropriately, as shown in FIG. 2. Upon pressing the key activating the wind range correction switch 25, the display 19 would read "12", meaning that the shot will play 12 yards longer than its actual 148 yards of the wind. Upon pressing the key activating the wind direction correction switch 26, the display would read "10", indicating that the shot should be aimed 10 yards to the left of the pin to compensate for the wind.

The remote unit 10 also has a "distance corrected" switch 28. Upon pressing the key to activate the switch 28, the golfer may read from the display 19 the distance between the remote unit 10 and the base unit 11 on the pin as corrected for the input wind conditions. For example, if the remote unit 10 measures exactly 148 yards to the pin, and the wind range correction indicates that the shot will play 12 yards longer than it actually is, the golfer will see the number 160 at the display 19 upon striking key which activates the distance corrected switch 28, indicating that the shot will play like a windless 160 yard shot.

The remote unit also has a club selection switch 29. Upon pressing the key initiating the switch 29, the golfer can see at the display 19 an indication of the proper club that should be slected for the particular shot. If the proper club is a No. 3 wood, the displayed symbol will be "1". If the proper club is an iron, the displayed symbol will be a one-digit number indicating the proper numbered iron. If the proper club is a wedge, the displayed symbol will be "10". For example, for the shot having a corrected distance of 160 yards, if the player strikes the switch 29, the display will show "5" which means that a No. 5 iron is the appropriate club for the shot.

Figure 3:
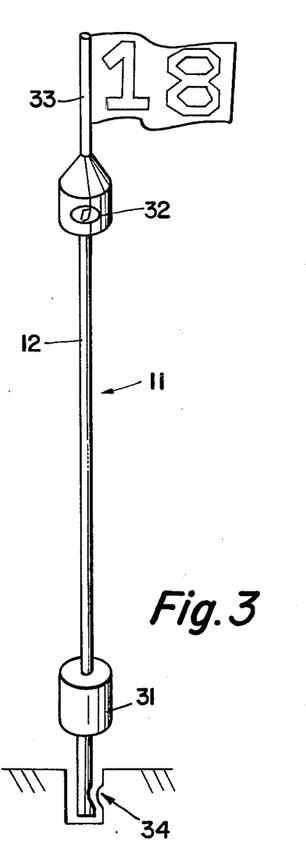
FIG. 3 is a perspective view of the base unit of FIG. 1 to a larger scale and of the flag pole on which it is mounted.

The base unit 11 is shown in greater detail in FIG. 3. The base unit 11 is preferably mounted directly on the flag pole 12, and comprises a battery and electronic package 31 mounted on the lower portion of the flag pole 12 and a sonic transducer unit 32 is mounted near the top of the flag pole. The upper portion of the pole 12 also contains an RF antenna encapsulated in a non-metallic upper section 33 of the pole. The sonic transducer unit 32 is oriented to project the ultrasonic signal toward the fairway in which the golfer is approaching the green. To assure that the transducer is properly oriented, the bottom of the pole 12 contains a key 34 so that the pole is correctly oriented when placed in the hole. The base unit 11 is powered by conventional rechargeable batteries, and if desired, the unit can be made to operate with batteries recharged by solar cells mounted on the pole.

Figure 4:
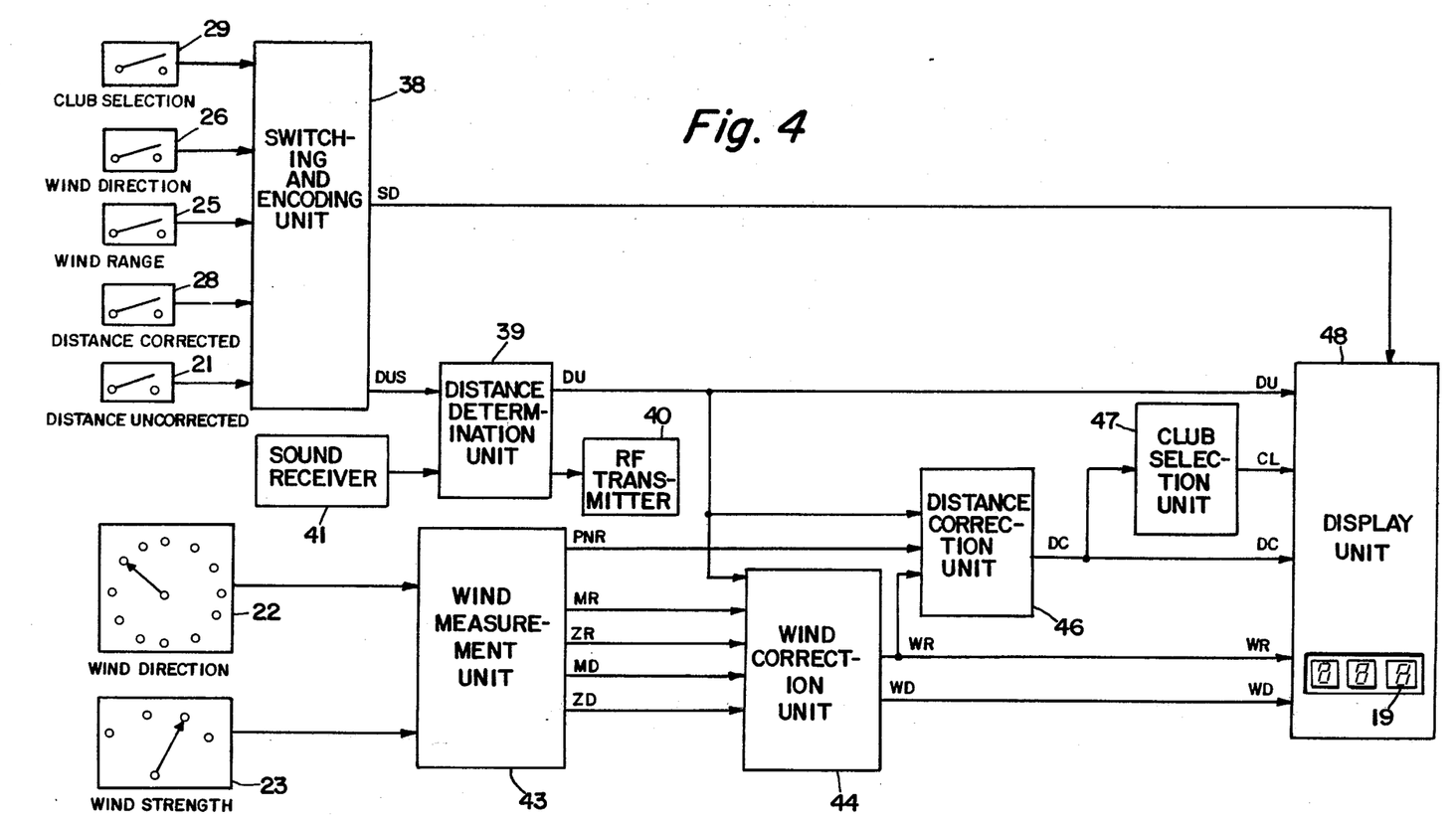
FIG. 4 is a diagrammatic block diagram illustrating the internal operation of the remote unit of FIG. 2.

The internal circuitry of the remote unit 10 is summarized schematically in FIG. 4. The switches 21, 25, 26, 28 and 29 are connected to a switching and encoding unit 38 which provides appropriate encoded signal SD in relation to whichever switch has been activated by the golfer. An output signal DUS indicating the activation of DU switch 21 is sent to a distance determination unit 39. Unit 39 activates an RF transmitter 40 which emits the RF pulse toward the base unit 11. When the return ultrasonic signal is sent to the remote unit, it is picked up by a sound receiver 41, and an electrical signal is transmitted to the distance determination unit 39. The internal logic of the unit 39 measures the time interval between the command sent to the RF transmitter 40 and the signal received by receiver 41 and converts this time interval to uncorrected distance data DU, which is output from the unit 39.

The wind information inputed through the wind direction dial 22 and the wind strength switch 23 is sent to a wind measurement unit 43 where it is combined and converted to a plurality of wind measurement signals MR, ZR, MD and ZD. The unit 43 also provides a signal PNR indicating a positive or negative wind range correction, depending upon whether the wind is blowing toward the pin or toward the golfer. The wind measurement signals from the unit 43 are sent to a wind correction unit 44 along with the uncorrected distance data DU from the unit 39. The unit 44 converts the input information to wind range correction data WR indicating the longitudinal wind effect on the distance between the golfer and the pin, and wind direction correction data WD indicating the distance the shot must be aimed offline to compensate for the lateral wind effect.

The uncorrected distance data DU and the wind range correction data WR are sent to a distance correction unit 46 along with the signal PNR indicating the positive or negative wind range correction. Unit 46 adds or subtracts the wind range correction from the uncorrected distance in accordance with the signal PNR to obtain corrected distance data DC. The data DC is sent to a club selection unit 47 which outputs club selection data CL based upon the corrected distance to the pin.

The data DU, DC, CL, WR and WD are all sent to a display unit 48 containing the LED display 19. The selection of which data will appear in the display 19 is controlled by the display selection signal SD from the switching and encoding unit 38.

The remote unit of FIG. 4 is shown in greater detail in the circuit diagrams of FIGS. 5-8.

Figure 5:
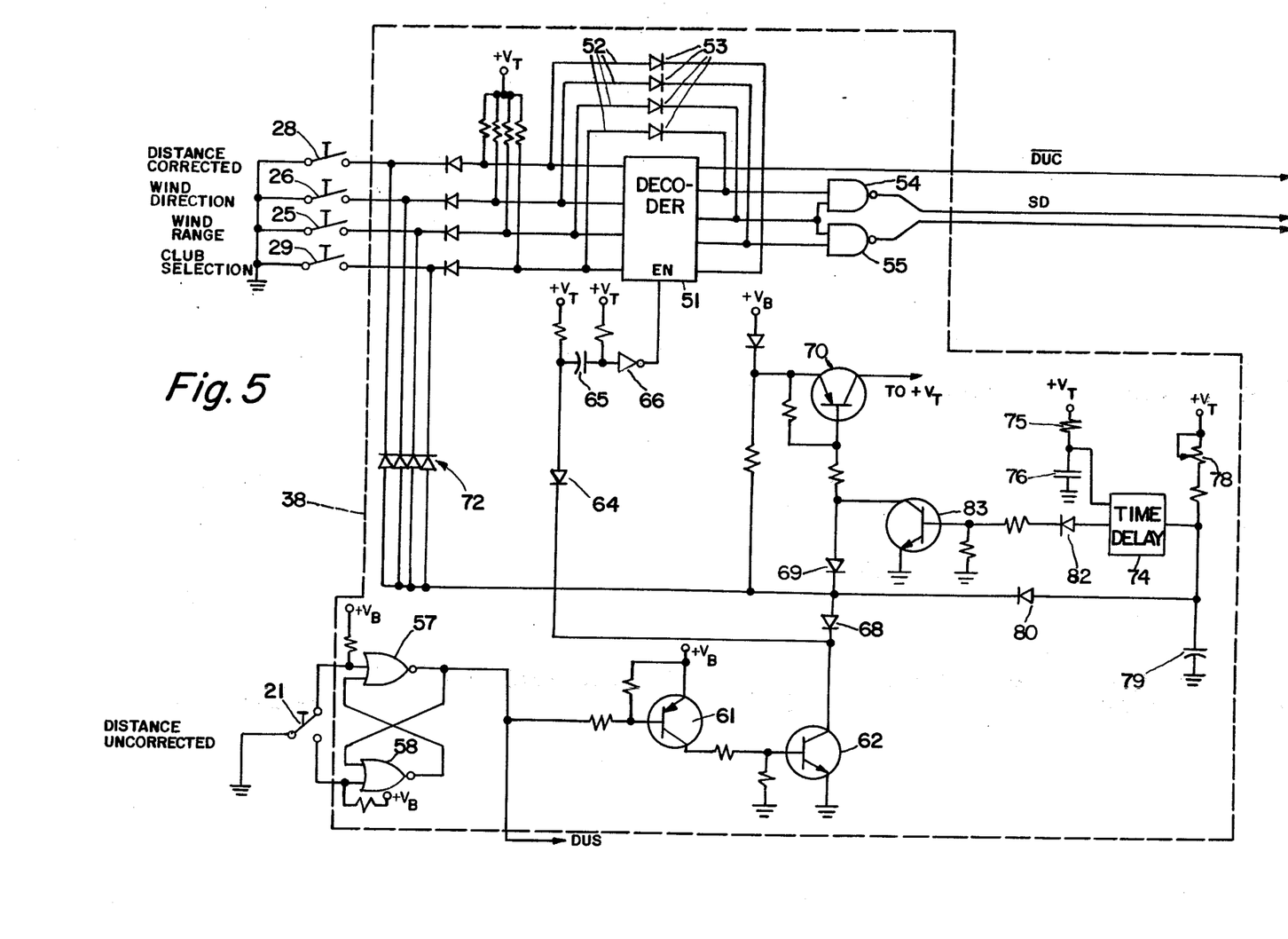
FIG. 5 is a detailed circuit diagram of a portion of FIG. 4 including the switching and encoding unit.

FIG. 5 shows in detail the switching and encoding unit 38. Switches 25, 26, 28 and 29 are connected between a positive supply voltage and ground with one terminal of each switch providing the inputs to a decoder 51 which may be a 74154 unit manufactured by Texas Instruments, Inc. With a low-level enable input EN, decoder 51 provides output signals indicating the closing of one and only one of the switches. When any one of the switches is closed, an input line to the decoder 51 goes to low level, and the decoder supplies a low output signal on the corresponding output line. When the switch is released, the input signal returns to high level and the corresponding output signal is returned to high level. Lines 52 having diodes 53 are supplied to handle the current surge which occurs when the switch is opened. If the enable input EN is high level, the decoder 51 will be disabled and all output lines will go to high level. Three of the output lines from decoder 51 are encoded by a pair of NAND gates 54 and 55 which supply a two-bit display selection control signal SD. Signal SD comprises two lines capable of four states relating which of the four switches 25, 26, 28 or 29 have been actuated, and thus which of the four pieces of information are selected for display. Another output from decoder 51 is the signal $\overline{DUC}$ which indicates whether any of the four switches have been actuated. The signal $\overline{DUC}$ is high level if any of the switches 25, 26, 28 or 29 have been closed, or if the decoder 51 is disabled, and is low level if none of the switches 25, 26, 28 or 29 is actuated and the decoder 51 is enabled. The signal $\overline{DUC}$ thus indicates whether wind corrected information has been selected for display. A high level $\overline{DUC}$ indicates that wind corrected information is desired because one of the switches 25, 26, 28 or 29 have been actuated, while a low level $\overline{DUC}$ indicates that uncorrected information is desired.

The "distance uncorrected" switch 21 is connected to a latch comprising two NOR gates 57 and 58. The latch produces a stable output signal DUS from the status of the switch 21 and eliminates any make-break cycles from contact bounce. The DUS signal is sent to the base of an inverter transistor 61 having its emitter connected to a positive supply voltage. The collector of the transistor 61 is connected to the base of an inverter transistor 62. The collector of the transistor 62 is connected to enable input of decoder 51 through a diode 64, a capacitor 65 and an inverter 66. When switch 21 is actuated, the signal DUS goes to low level, and the transistors 61 and 62 are turned on. This presents a low-level input to the inverter 66 producing a disable signal to the input EN of the decoder 51. After the capacitor 65 is charged, a high level input is provided to the inverter 66 producing a low-level enable signal to the input EN of the decoder 51. When the decoder 51 is enabled, the signal $\overline{DUC}$ goes to low level because none of the other switches 25, 26, 28 or 29 is closed. The low level $\overline{DUC}$ signal indicates that uncorrected distance information is desired for display.

The output of the transistor 62 also controls a power timeout circuit which provides power to the positive voltage sources for a fixed time duration after any of the switches have been actuated. The collector of the transistor 62 is connected through diodes 68 and 69 to the base of a transistor 70, which has its emitter connected to the positive voltage supply from the remote unit battery ($+V_B$) and which has its collector connected to supply the various positive voltage sources in the unit, identified as $+V_T$. The switches 25, 26, 28 and 29 are also connected to the base of the transistor 70 through diodes 69 and 72. When the transistor 62 goes on or when any of the switches 25, 26, 28 or 29 is actuated, the base of the transistor 70 is grounded, and the transistor is switched on.

A time delay unit 74 is used to maintain the transistor 70 on for a set period of time after any of the switches have been actuated. The time delay unit 74 is triggered through an input connected across a resistor 75 to the timed-out voltage supply $+V_T$. The trigger input is normally grounded through a capacitor 76. The time delay duration of the unit 74 is set by a predetermined input bias through a variable resistance 78 and a capacitor 79. The capacitor 79 is connected to the switches through a diode 80 to assure repeatable time out periods. The time delay unit 74 functions essentially as a one-shot. Upon a high-level pulse at the trigger input, the unit 74 releases a short circuit across the capacitor 79 and drives the output to high level. When the voltage across the capacitor 79 increases, the unit 74 drives the output to low level and discharges the capacitor 79. The duration of the high-level output from the unit 74 is thus set by the period of time required to substantially charge the capacitor 79. The output of the unit is connected through a diode 82 to the base of an inverter transistor 83, which has its collector connected to the base of the transistor 70. The high-level output of the time delay unit 74 is thus inverted by the transistor 83 and used to maintain the transistor 70 on for the time delay set by the unit 74.

In the operation of the power time out circuit, the transistor 62 is initially off and the switches 25, 26, 28 and 29 are open, so that the base of the transistor 70 receives high-level bias voltage from the battery voltage supply, and no power is being supplied from the battery to the remainder of the circuitry. Upon actuation of any of the switches 21, 25, 26, 28 or 29, a low level input is presented to the base of the transistor 70, switching the transistor on and supplying power to the circuitry, including the resistor 75 connected to the trigger input of the time delay unit 74. The rising voltage to the trigger, providing a high-level output through the diode 82 to the transistor 83. The transistor 83 is turned on, and maintains the transistor 70 in a conductive state to power the circuitry. The time delay unit 74 times out after a predetermined interval set by the variable resistance 78 and the capacitor 79. The output of the unit 74 then drops to low level, turning off the transistor 83. The high-level input to the base of the transistor 70 from the collector of the transistor 83 causes the transistor 70 to be turned off, removing power from the supply line connected to the collector of the transistor 70, so that power is no longer supplied to the unit.

Figure 6:
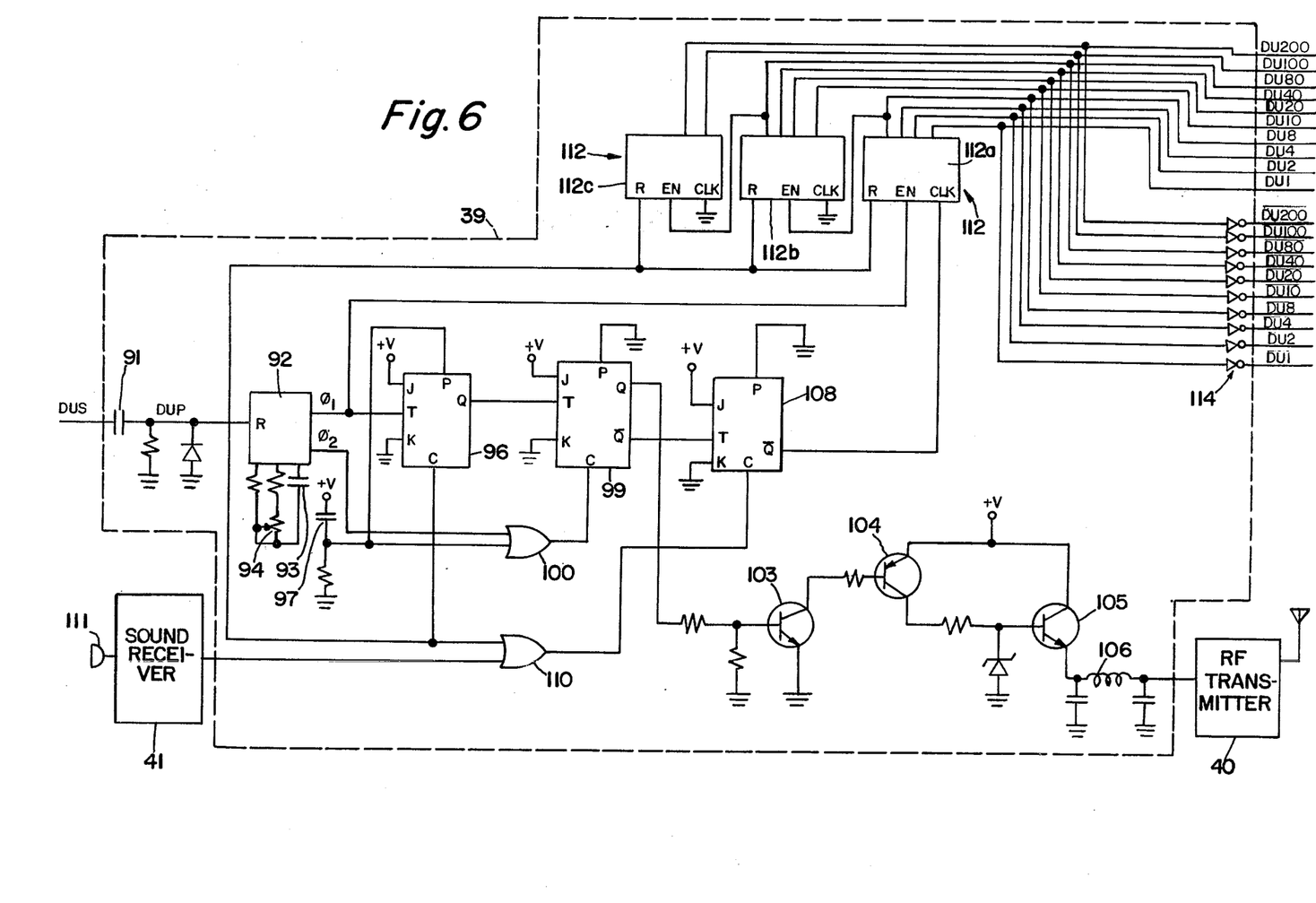
FIG. 6 is a detailed circuit diagram of a portion of FIG. 4 including the distance determination unit.

FIG. 6 shows in detail the distance determination unit 39. The signal DUS from NOR gates 57 and 58 is supplied to a capacitor 91 which results in signal DUP which has a high-level pulse upon the opening of the switch 21. The pulse signal DUP serves as a reset input for a timing signal generator or timer 92, which may be a voltage controlled oscillator such as a standard 4060 unit, set to generate a timing signal $\phi_1$ of a predetermined frequency by means of an externally connected capacitor 93 and variable resistor 94. The speed of sonic signals through air is known to be 1090 ft/sec or 363.33 yd/sec, so that a sonic signal travels one yard every 2.75 msec. The timer 92 is set to produce the negative edge of a high-level signal every 2.75 msec, resulting in an output frequency of 363.33 Hz for the timing signal $\phi_1$. Thus the timer 92 produces a cycle for each yard travelled by the ultrasonic signal from the base unit 11. The initial negative edge (high to low-level transition) of the of the timing signal $\phi_1$ is synchronized with the positive edge (low to high-level transition) of the signal DUS through the reset input R of the timer 92. The timer 92 also produces a second timing signal $\phi_2$ having a frequency equal to that of the primary timing signal $\phi_1$ divided by $2^8$ or 1.42 Hz, so that signal $\phi_2$ has a positive edge every 0.7 seconds.

The timing signal $\phi_1$ provides the toggle input T to a flip-flop 96 having a fixed high-level input J, a grounded input K, and a clear input C connected to the pulse signal DUP from the capacitor 91. The preset input P is connected through a capacitor 97 to a positive voltage supply so that the flip-flop 96 is initially set with a high-level output Q during initial power-on of the remote unit. The flip-flop 96 output Q goes to low level upon a positive pulse signal DUP received at the clear input C and thereafter returns to high level at the next negative edge of the timing signal $\phi_1$ received at the toggle input T.

The output Q from the flip-flop 96 provides the toggle input T to a second flip-flop 99, also having a fixed high-level input J, a grounded input K, and a grounded preset input P. The clear input C of the flip-flop 99 is connected to both the capacitor 97 and the low frequency timing signal $\phi_2$ from the timer 92, through an OR gate 100. During the initial remote unit power-on, the output Q of the flip-flop 99 is set to low level, and the inverted output $\overline{Q}$ is set to high level, because of the high-level clear input C from the capacitor 97. Thereafter, the output Q goes to high level, and the inverted output $\overline{Q}$ goes to low level, upon receiving a negative edge signal at the toggle input T. The output Q returns to low level and the inverted output $\overline{Q}$ returns to high level when the low frequency timing signal $\phi_2$ received at the clear input C goes to high level.

The output Q from the flip-flop 99 is connected to the base of an inverter transistor 103, the collector of which is connected to an inverter power transistor 104. The emitter of the transistor 104 is connected to a higher positive voltage supply, such as 12 volts, and the collector is connected to another power transistor 105, which is an emitter-follower transistor with the collector also connected to the higher positive voltage supply. The emitter of the transistor 105 is connected through an inductor 106 to the RF transmitter 40 which generates the RF pulse signal to the base unit 11. When the output Q from the flip-flop 99 goes to high level, it turns on the transistors 103 and 104, so that the base of the transistor 105 receives a high level input and current is supplied from the emitter of the transistor 105 to the inductor 106. As the inductor 106 charges, the transmitter 40 is activated.

The transmitter 40 may be a standard inexpensive CB "walkie-talkie" unit which is fixed in the transmit position. A suitable oscillator circuit (not shown) may be connected to the microphone input of the transmitter 40 to generate a proper electrical signal to modulate the RF carrier signal. The transmitter 40 receives its power from the line from the inductor 106, so that the transmitter is turned on through the control of the output Q of the flip-flop 99.

The output $\overline{Q}$ from the flip-flop 99 provides the toggle input T to a third flip-flop 108, which also has a fixed high-level input J, a grounded input K, and a grounded preset input P. The clear input C of the flip-flop 108 is connected both to the pulse signal DUP and to the output of the sound receiver unit 41, through an OR gate 110. The sound receiver unit 41 contains means 111 for sensing the ultrasonic signal emitted by the base unit 11 in response to the RF pulse from the transmitter 40 and for supplying an electrical signal when the ultrasonic signal is sensed. The inverted output $\overline{Q}$ of the flip-flop 108 is connected to the enable or clock input CLK of the lower counter 112a of an interconnected set of BCD counters 112. When the input CLK goes to low level, each counter in the set of counters 112 registers a count on the negative edge of the other enable input EN. The input EN of the lower counter 112a is supplied by the timing signal $\phi_1$ from the timer 92, so that the lower counter 112a counts one bit on each negative edge of the timing signal $\phi_1$ while the output $\overline{Q}$ of the flip-flop 108 is low level. Since the timing signal $\phi_1$ is set to provide a negative edge every 2.75 msec, this represents one yard of distance travelled by the sound pulse from the remote unit. The counters 112b and 112c assume the count for the next decades with the clock input CLK grounded and the enable input EN of each counter connected to the highest bit of the next lower counter, so that a count is registered when the highest bit returns to low level. The reset input R of each of the counters 112 is connected to the pulse signal DUP, so that the count is set to zero when the DU switch 21 is released.

Figure 7:
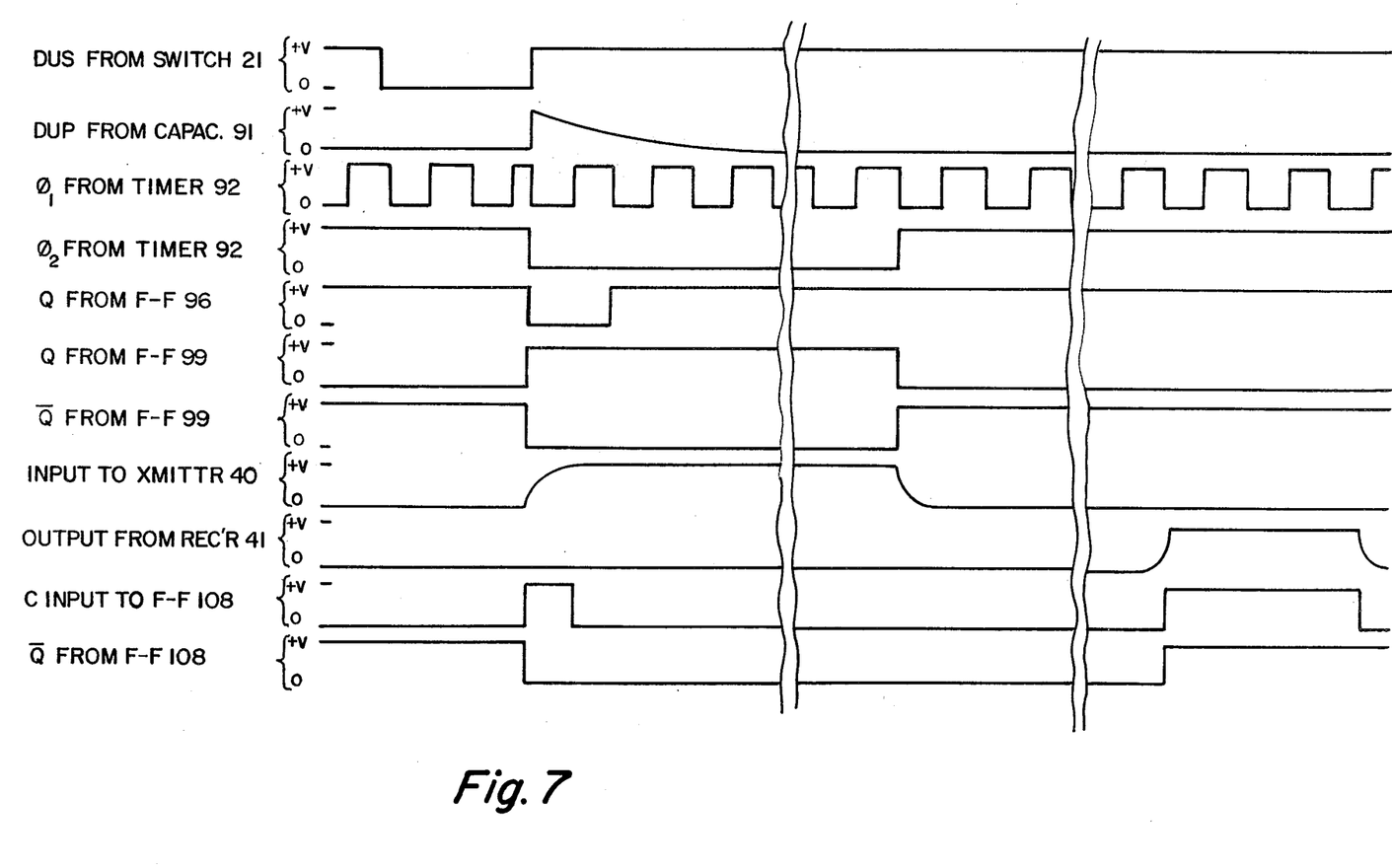
FIG. 7 is a timing sequence diagram illustrating the operation of the distance determination unit of FIG. 6.

The operation of the distance determination unit can be described with reference to timing sequence of FIG. 7. When the golfer pushes and releases the key activating the DU switch 21, the signal DUS goes to low level and returns to high level, and the output DUP from the capacitor 91 transmits a high-level pulse. The timer 92 is reset and the timing signals $\phi_1$ and $\phi_2$ begin in synchronization with the signal DUP. The signal DUP at the input C clears the flip-flop 96, providing a low-level output Q. After the capacitor 91 has been substantially charged, the input C of the flip-flop 96 returns to low level, and the output Q of the flip-flop 96 will return to high level upon the next negative edge toggle input T signal from the timing signal $\phi_1$.

The output Q of the flip-flop 99 is initially low level. When the flip-flop 96 is cleared, the input T to the flip-flop 99 drops to low-level, toggling the flip-flop and causing the output Q of the flip-flop 99 to go high since the input J is fixed high. The high level output Q from the flip-flop 99 is inverted twice by the transistors 103 and 104 and activates the RF transmitter 40 after energizing the inductor 106. The inverted output Q from the flip-flop 99 also goes to low level when flip-flop 96 is cleared.

After the primary timing signal $\phi_1$ has undergone half of 256 cycles, so that the counters 112 have reached the value of 128 yards, the low frequency timing signal $\phi_2$ goes to high level, clearing the flip-flop 99 and driving its output Q low. The low level output Q from the flip-flop 99 turns off the signal to the transmitter 40.

The inverted output $\overline{Q}$ of the flip-flop 108 is initially high level. When the signal DUP gives a positive pulse and the inverted output $\overline{Q}$ of the flip-flop 99 goes low, the input T of the flip-flop 108 drops to low-level, toggling the flip-flop and sending the output $\overline{Q}$ to its low level. The low level input CLK to the counter 112a activates the counters 112 to begin counting one bit for each negative edge on the timing signal $\phi_1$.

When an ultrasonic signal is sensed by the receiver 41, it provides a high-level clear signal to the input C of the flip-flop 108 which returns the inverted output $\overline{Q}$ to its high level, deactivating the counter 112a. The accumulated count in the counters 112 is then equal to the uncorrected distance in yards between the base unit 10 and the remote unit 11 as measured by the time interval between the transmittal and the receipt of the ultrasonic signal. The uncorrected distance data is read from the counters 112 on a plurality of BCD lines labeled DU. The signals on the lines DU are inverted by inverters 114 to provide inverted data $\overline{DU}$.

Figure 8:
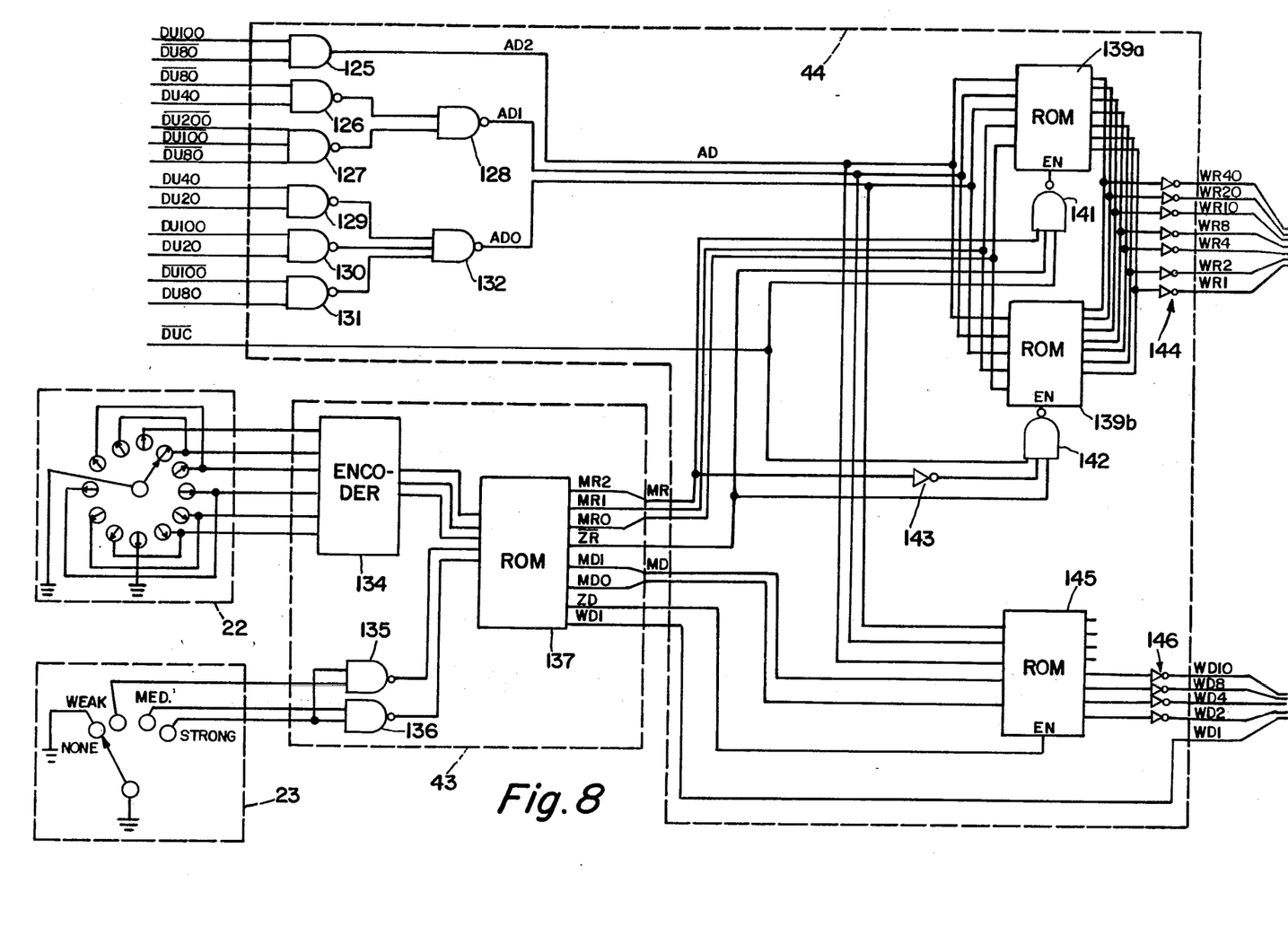
FIG. 8 is a detailed circuit diagram of a portion of FIG. 4 including the wind measurement and wind correction units.

Selective bits of the data DU and $\overline{DU}$ are sent to the wind correction unit 44 as shown in FIG. 8. The unit 44 includes a plurality of gates 125-132 for encoding the data to form three-bit address data AD. The three-bit data AD is used in combination with other data to address read-only memory (ROM) units containing the yardage corrections for range and direction based upon the input wind conditions.

The wind direction and the wind strength are input from the wind direction dial 22 and the wind strength switch 23 to the wind measurement unit 43 (FIG. 8). The wind direction data is supplied from the dial 22 to an eight-line-to-three-line priority encoder 134, which may be a 74148 unit manufactured by Texas Instruments or other similar unit. The upper bit of the three-bit output from the encoder 134 indicates whether the wind range correction is positive or negative, and this signal is sent on line PNR from the unit 43 to the distance correction unit 46. The wind strength data from the switch 23 is encoded by a pair of NAND gates 135 and 136 to form a two-bit output representing the wind strength setting. The encoded wind direction and wind strength data from the encoder 134 and the gates 135 and 136 are used to address a read-only memory unit 137, which is preferably a 32 × 8 ROM. The eight bits of data output from the ROM unit 137 are supplied to the wind correction unit 44 and are used to address and control the ROM units containing the wind range and direction correction data.

The wind range correction data are stored in two ROM units 139a and 139b, each preferably 32 × 8, which are addressed by the three-bit data AD and by the lower two bits of the three-bit wind range measurement data MR from the ROM unit 137. The upper bit MR2 is used to control which of the two ROM units 139a or 139b is enabled. The signal MR2 is connected to the enable input EN of the ROM unit 139a through a NAND gate 141, and an inverted signal $\overline{MR2}$ from an inverter 143 is connected to the enable input EN of the ROM unit 139b through a NAND gate 142. If the signal MR2 is high level, the ROM unit 139a is operative, and if the signal MR2 is low level, the inverted signal $\overline{MR2}$ is high level, and the unit 139b is operative.

The operation of both ROM units 139a and 139b is also controlled by a zero range correction signal $\overline{ZR}$ which is also input to the NAND gates 141 and 142. The zero range signal $\overline{ZR}$ is output from the ROM unit 137 and indicates whether any wind range correction is present from the input wind information. If, for example, the wind range switch 23 is set to indicate that there is no wind, or if the wind direction dial 22 is set to indicate that the wind is blowing directly across the fairway, zero range correction signal $\overline{ZR}$ will go to a low level, rendering both ROM units 139a and 139b inoperative, so that the wind range correction data WR will read zero.

The ROM units 139a and 139b are also controlled by the signal $\overline{DUC}$ from the switching and encoding unit 38 which is input to both NAND gates 141 and 142. The signal $\overline{DUC}$ is high level if any of the switches 25, 26, 28 or 29 have been actuated, so that the distance information should be corrected for input wind conditions. The signal $\overline{DUC}$ is low level if the switch 21 has been actuated, so that no wind corrections should be made. If the signal $\overline{DUC}$ is low level, the ROM units 139a and 139b are rendered inoperative, and the output wind range correction data WR will read all zeros.

The seven-bit data output from the ROM units 139a and 139b is inverted by a plurality of inverters 144 to form the seven-bit data WR. It is understood that in place of the two 32 × 8 ROM units 139a and 139b, a single 64 × 8 ROM unit can be used, in which case, the larger ROM unit would be addressed by the three-bit data AD and by all three bits of the data MR.

The wind direction correction information is stored in a read-only memory unit 145. The ROM unit 145 is addressed by the three-bit data AD and by the two-bit wind direction data MD from the ROM unit 137. The operation of the ROM unit 145 is controlled by the zero wind direction correction signal ZD from the ROM unit 137. The ROM unit 145 is inoperative and wind direction data WD is zero if the signal ZD is high level, indicating a zero wind direction correction, which would occur, for example, if the wind strength switch 23 was set to indicate no wind or if the wind direction dial 22 was set to indicate only a direct head wind or tail wind without any cross wind. The four-bit data output from the ROM unit 145 is inverted by a plurality of inverters 146 to form the upper four bits of the data WD, the lower bit being provided directly from the ROM unit 137. The ROM unit 145 may be a 32 × 8 ROM, similar to the ROM units 137, 139a and 139b, but a smaller ROM, such as a 32 × 4 would be sufficient.

Figure 9:
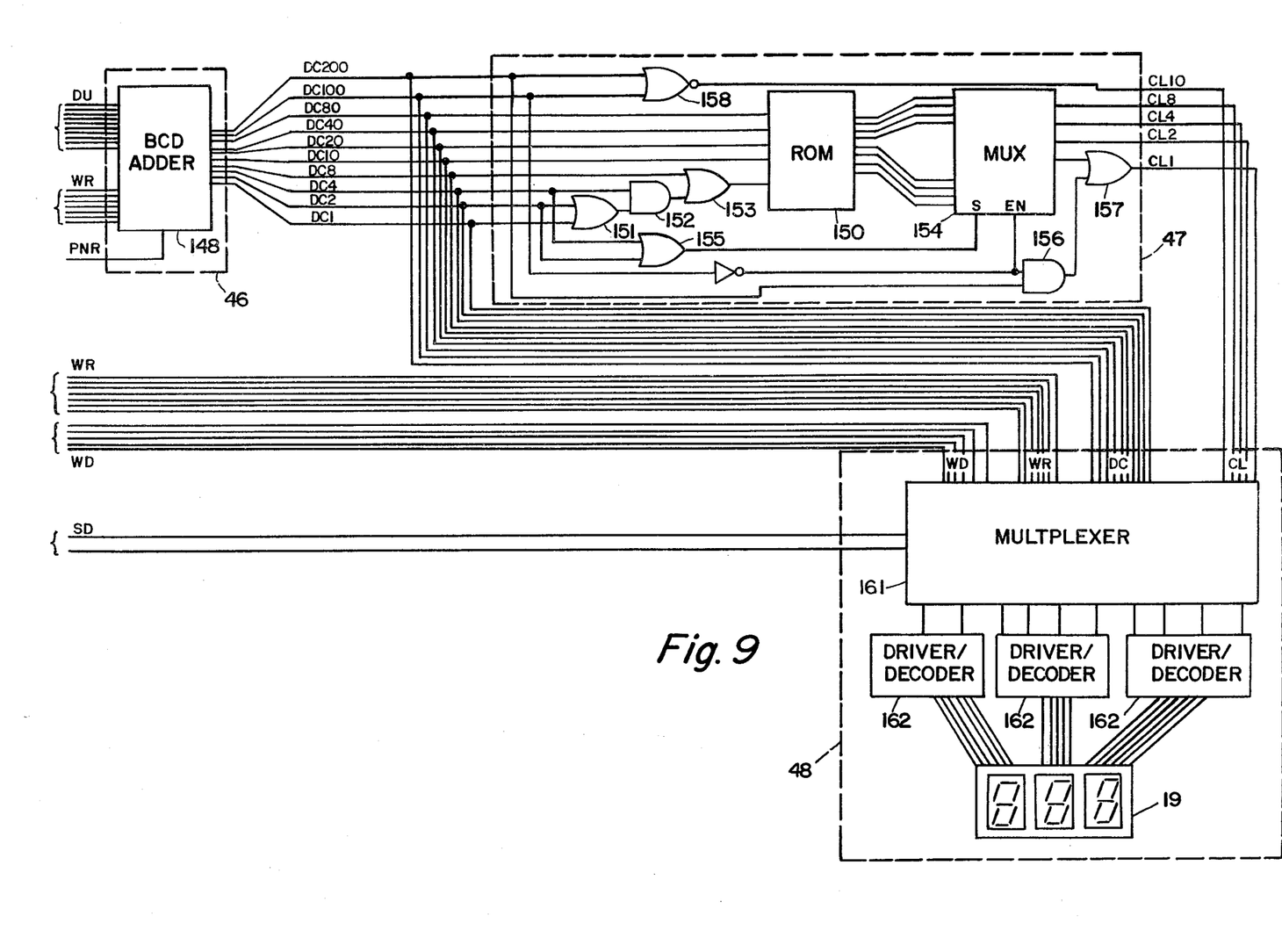
FIG. 9 is a detailed circuit diagram of a portion of FIG. 4 including the distance correction unit, the club selection unit and the display unit.

The wind corrected distance data DC is obtained from the uncorrected distance data DU and the wind range correction data WR through the distance correction unit 46. As shown in FIG. 9, the unit 46 comprises a BCD adder 148 which may comprise three standard BCD adder units 82582 suitably connected together. The operation of the adder 148 is controlled by the signal PNR indicating the positive or negative wind range correction. If the signal PNR is high level, the setting from the dial 22 indicates that the wind is blowing toward the green, and the wind range correction data WR should be subtracted from uncorrected distance data DU to obtain the corrected distance data DC. If the signal PNR is low level, the wind setting from the dial 22 indicates that the wind is blowing toward the golfer and the wind range correction data WR should be added to the uncorrected distance data DU to obtain the corrected distance data DC.

The corrected distance data DC is supplied to the club selection unit 47. The club selection information is contained in a ROM unit 150, which may also be a 32 × 8 ROM. The middle four-bits of BCD data DC10 through DC80, comprising the second decimal digit, are used directly to address the ROM unit 150. The lower four-bits of BCD data DC1 through DC8, comprising the first decimal digit, are encoded by a plurality of gates comprising OR gate 151, AND gate 152, and OR gate 153 to provide a single bit used to address the ROM unit 150. The ROM unit 150 outputs two 4-bit data words which are fed to a multiplexer 154. The selection of the two 4-bit data words input to the multiplexer 154 is controlled by the data bits DC2 and DC4 which are connected to the select input S by an OR gate 155. It should be understood that in place of the 32 × 8 ROM unit 150 and the multiplexer 154. a 64 × 4 ROM could be used, if available. The preferred design comprising the ROM unit 150 and the multiplexer 154 is used to take advantage of readily available commercial IC units.

The enable input EN to the multiplexer 154 is supplied by the inverted data bit $\overline{DC100}$. The inverted bit $\overline{DC100}$ and the bit DC200 are also combined in an AND gate 156 and fed to an OR gate 157 along with the lower output bit from the multiplexer 154 to form the lowest bit CL1 of the club selection data CL.

The BCD club selection data CL comprises a decimal value between "1" and "10" which represents the proper club. If the corrected distance is greater than 200 yards, the selected club will be a No. 3 wood, and the club selection data will indicate a decimal "1". If the corrected distance is less than 200 yards, the selected club will be the appropriate iron. For less than 100 yards, the selected club will be a wedge, and this will be indicated in the club selection data as a decimal "10". For a corrected distance of between 100 and 200 yards, the selected club will be appropriate numbered iron from a No. 9 iron to a No. 2 iron, and the club selection data will represent this club with a decimal value of "2" to "9".

The data bit CL10 supplies the upper decimal digit. The bit CL10 is high level if the club selection is a wedge and is low level otherwise. The data bit CL10 is supplied from the corrected distance bits DC100 and DC200 through a NOR gate 158. When the corrected distance yardage is less than 100 yards, the club selection CL10 is high level. In addition, when the corrected distance is less than 100 yards, the multiplexer 154 is disabled by the high-level inverted bit $\overline{DC100}$ which is used as the enable input EN to the multiplexer, setting the data bits CL1 through CL8 to zero, and a low-level data bit CL1 is supplied from the AND gate 156 through the OR gate 157, so that the club selection data CL is a decimal "10".

For corrected distance yardages of between 100 yards and 200 yards the club selection varies from a No. 2 iron to a No. 9 iron, and the club selection data CL varies from a decimal "2" to a decimal "9" depending on the distance. In this range of 100–200 yards, the ROM unit 150 operates in conjunction with the multiplexer 154 from the input distance data bits DC1 through DC80 to supply the proper iron club selection number on the lower four BCD data bits CL1 through CL8. The upper bit CL10 is maintained at low level by the NOR'ed data bits DC100 and DC200 from the gate 158.

If the corrected distance is greater than 200 yards, the club selection unit indicates that a No. 3 wood should be selected, and this is represented in the club selection data CL as a decimal "1". When the corrected distance is greater than 200 yards, the inverted data bit $\overline{DC100}$ is high level, disabling the multiplexer 154 through the input EN. A high level signal is provided to the lowest data bit CL1 through the AND gate 156 and the OR gate 157. The upper bit CL10 is set to low level by the output of the NOR gate 158.

The club selection data CL along with the corrected distance data DC, the wind range correction data WR, and the wind direction correction data WD are all fed to the display unit 48 which operates under the control signal of the display selection control SD. The display unit 48 comprises a multiplexer 161 which may be composed of five standard 74LS153 multiplexers, manufactured by Texas Instruments. The multiplexer unit 161 selects which of the four input data CL, DC, WR or WD will be shown in the three-digit LED display 19. The output from the multiplexer 161 is supplied to three standard LED display drivers 162, such as 7447A units manufactured by Texas Instruments, which supply the necessary seven-segment signals to each of the three LED display digits. In place of the LED display, a LCD display could be advantageously utilized since a LCD display would be easier to read in bright sunlight.

It will be noted that the remote unit preferably uses TTL components and other components, such as CMOS, which are TTL compatible. It is to be understood, however, that the components may also be selected from other families.

Figure 10:
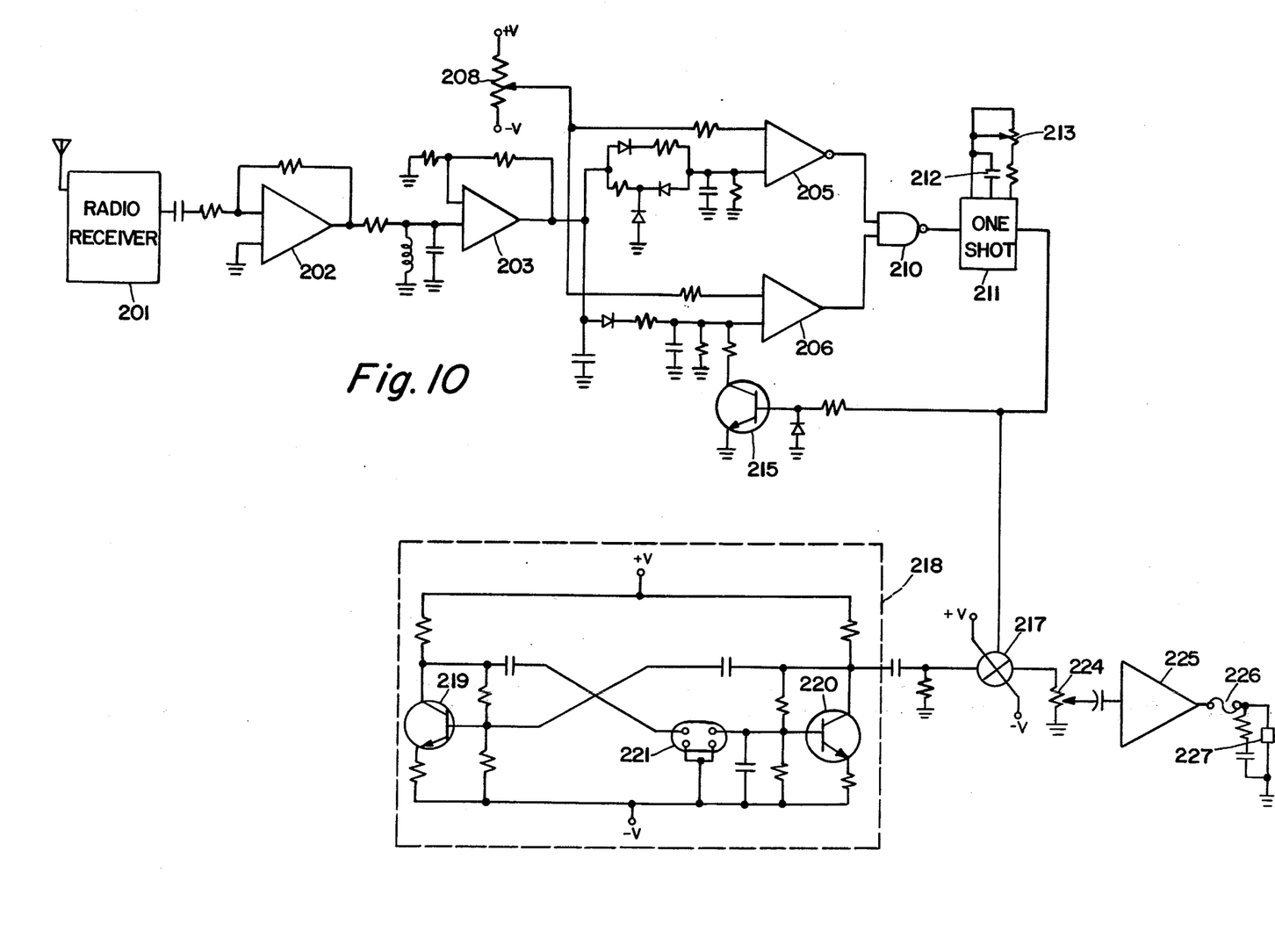
FIG. 10 is a detailed circuit diagram illustrating the internal operation of the base unit of FIG. 3.

FIG. 10 shows in detail the internal circuitry of the base unit 11 which receives the RF signal from the remote unit and immediately emits an ultrasonic signal. The base unit 11 receives the RF pulse signal through a radio receiver 201. The radio receiver 201 may be an inexpensive CB "walkie-talkie" unit, similar to the radio transmitter 40, but fixed in the receive position. The output from the receiver 201 is supplied to a series of operational amplifiers 202 and 203, each having external feedback circuits. The amplified output from the amplifier 203 is supplied to a pair of parallel operational amplifiers 205 and 206. The amplifiers 205 and 206 are also supplied with a variable voltage input from an adjustable control 208 which is used as a sensitivity setting for the receipt of the RF signal. The inputs to the amplifiers 205 and 206 have selected time constants to reject spurious signals and pass the desired signal tone. The output from the amplifier 205 is combined with the inverted output from the amplifier 206 by a NAND gate 210, and the resulting signal is used to trigger a one-shot 211. When triggered, the one-shot 211 has a high level output of a duration fixed by an externally connected capacitor 212 and variable resistor 213. The output from the one-shot 211 is fed back to the base of an inverter transistor 215, the collector of which is used to bias the input to the amplifier 206.

When the correct signal is received from the remote unit, the output of the amplifier 206 is driven to high (positive) level.

Due to the selected time constants of the inputs to the amplifiers 205 and 206, the inverted output of the amplifier 205 remains at high level momentarily and thereafter is driven to low (negative) level. The NAND gate 210 thus momentarily receives two high level inputs, causing the output of the gate 210 to drop to low level. This low level pulse triggers the one-shot 211, and raises the output of the one-shot to high level. The high level signal from the one-shot 211 is received at the base of the transistor 215 and turns the transistor on, grounding the input to the amplifier 206. The output of the amplifier 206 then drops to low level. The NAND gate 210 receives two low level inputs, so that its output is fixed at high level, preventing further retriggering of the one-shot 211 until the one-shot times out as determined by the capacitor 212 and the variable resistor 213.

The output from the one-shot 211 is also used to control an analog gate 217. A free-running multivibrator 218 comprising collector-coupled transistors 219 and 220 and a frequency sensitive ceramic filter 221 is used to supplied signal at an ultrasonic frequency. The filter 221 is used in the multivibrator 218 to establish and maintain a signal of an exact frequency. The high-frequency signal from the multivibrator 218 is connected to the analog gate 217. Upon actuation of the one-shot 211, the gate 217 is opened to permit the high frequency signal from the multivibrator 218 to be gated through to a variable resistance control 224 which is used to set the desired volume level of the ultrasonic output of the base unit. The desired level from the control 224 is input to an amplifier 225, the output of which is connected through a fuse 226 to a speaker 227 from which the ultrasonic signal having the frequency generated by the multivibrator 218 and having the duration controlled by the one-shot 211 is sent from the base unit 11 to the remote unit 10.

While a preferred form and embodiment of the present invention has been described and illustrated herein it will be apparent to those who come to understand the essential principles of the invention that other forms and embodiments may be employed without departing from the spirit and scope of the invention. Accordingly, this invention is not to be limited to the form and embodiment herein specifically disclosed nor in any other way inconsistent with the progress in the art promoted by the invention.

What is claimed is:

1. A golf distance indicator system for providing a measurement of the distance between a golfer and a green on a golf course, comprising:
   a base unit adapted to be mounted near the golf green, said
   base unit comprising
   a radio receiver for receiving RF signals,
   means for detecting received RF signals of a predetermined nature, and
   a transponder for producing a sonic signal in response to said detecting means; and
   a remote unit adapted to be carried by the golfer, said remote unit comprising
   a radio transmitter for sending an RF signal to said base unit,
   a sonic sensor for receiving said sonic signal from said base unit,
   means operatively connected to said radio transmitter and to said sonic sensor for determining the distance between said base unit and said remote unit from the time interval between the sending of said RF signal and the receiving of said sonic signal,
   means for inputing wind conditions, and
   means for correcting the distance from said determining means in accordance with said input wind conditions.

2. A golf distance indicator system as in claim 1 wherein said remote unit comprises in addition means for selecting the proper golf club for the following shot based upon the distance from said correcting means.

3. A golf distance indicator system as in claim 1 wherein said remote unit comprises in addition display means for outputting the distance from said determining means, the corrected distance from said correcting means, and the distance corrections from said obtaining means.

4. A golf distance indicator system as in claim 3 wherein said remote unit comprises in addition control means for selecting which one of the distance from said determining means, the corrected distance from said correcting means, and the distance corrections from said obtaining means will be output by said display means.

5. A golf distance indicator system as in claim 3 wherein said display means comprises a digital display.

6. A golf distance indicator system as in claim 1 wherein said inputing means includes a first switching device adapted to be set in accordance to the wind direction and a second switching device adapted to be set in accordance to the wind strength.

7. A golf distance indicator system as in claim 1 wherein said obtaining means determines a wind range correction for use by said correcting means, and a wind direction correction for assistance in aiming the next shot.

8. A portable distance indicator unit for use in golfing in conjunction with a base unit which includes means for generating a sonic signal in response to a predetermined radio signal, said portable unit comprising:
   means for transmitting said predetermined radio signal toward said base unit;
   means for receiving said sonic signal from said base unit;

means for generating an oscillating electrical signal having a frequency related to the speed of said sonic signal;

means for counting the cycles of said oscillating electric signal from said generating means;

means for simultaneously initiating said counting means and said transmitting means;

means for deactuating said counting means in response to said signal from receiving means; and means for reading the result from said counting means to obtain a distance measurement.

9. A distance indicator unit as in claim 8 comprising in addition:
- means for inputing wind conditions;
- means for determining distance corrections from said input wind conditions and from the distance measurement from said reading means; and
- means for correcting the distance in accordance with the distance corrections.

10. A golf distance indicator unit as in claim 9 comprising in addition means for selecting the proper golf club for the following shot based upon the corrected distance from said correcting means.

* * * * *